(12) United States Patent
Kobayashi

(10) Patent No.: US 8,068,261 B2
(45) Date of Patent: Nov. 29, 2011

(54) IMAGE READING APPARATUS, IMAGE READING METHOD, AND IMAGE READING PROGRAM

(75) Inventor: Masato Kobayashi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1165 days.

(21) Appl. No.: 11/878,061

(22) Filed: Jul. 20, 2007

(65) Prior Publication Data

US 2008/0018950 A1    Jan. 24, 2008

(30) Foreign Application Priority Data

Jul. 24, 2006 (JP) .................. 2006-201109

(51) Int. Cl.
*H04N 1/04* (2006.01)
(52) U.S. Cl. ......... 358/450; 358/474; 358/496; 358/497
(58) Field of Classification Search .................. 358/450, 358/474, 496, 497
See application file for complete search history.

(56) References Cited

U.S. PATENT DOCUMENTS 6,959,121 B2 * 10/2005 Kumazawa .................... 382/294

FOREIGN PATENT DOCUMENTS

| JP | 04-068367 | * | 4/1992 |
| JP | 09-083691 | | 3/1997 |
| JP | 09-245044 | | 9/1997 |
| JP | 2000-059602 | | 2/2000 |
| JP | 3629969 | | 12/2004 |
| JP | 2006-041612 | | 2/2006 |

* cited by examiner

*Primary Examiner* — Houshang Safaipour
(74) *Attorney, Agent, or Firm* — Harness, Dickey & Pierce, P.L.C.

(57) ABSTRACT

An image reading technique is disclosed that involves acquiring document image data including more than one set of page image data, reading an image located at a predetermined page position from the acquired set of page image data, recognizing the read image of the predetermined page position and converting the recognized image into text data, and assigning page number order to the set of page image data according to value information represented by the converted text data.

19 Claims, 19 Drawing Sheets

IMAGE READING APPARATUS, IMAGE READING METHOD, AND IMAGE READING PROGRAM

BACKGROUND OF THE INVENTION

1. Field of the Invention

The present invention relates to an image reading apparatus, an image reading method, and an image reading program for reading image data and performing character recognition on a portion of the image data.

2. Description of the Related Art

An image reading apparatus that reads image data and generates document data therefrom is conventionally used. Also, an image reading apparatus that reads image data and performs character recognition thereon is becoming increasingly popular. However, image reading may not necessarily be performed in the proper order and direction. Japanese Laid-Open Patent Publication No. 9-83691 discloses an image processing technique implemented in the case of alternatingly inputting odd numbered pages and even numbered pages of a book, the technique enabling images to be read in the proper direction and output in proper order based on the alignment direction of characters and preventing the pages from being read in reverse order.

However, the above-disclosed technique is implemented under the premise that the pages are arranged in proper order when they are read. Specifically, the above-disclosed technique merely relates to switching the direction in which pairs of successive pages are read according to whether characters are aligned vertically or horizontally. In other words, the disclosed technique does not relate to rearranging the direction of images that are read in different directions or rearranging the order of images that are not read in order. Thus, pages have to be arranged in proper order before image data of the pages are read according to the disclosed technique. However, in the case of processing image data of dual-side printed document pages, for example, it may be more convenient to read odd numbered pages first before reading the even-numbered pages. In the case of arranging image data of such document pages in order, the front and back side of each page may have to be read which may be quite burdensome. Accordingly, a technique is in demand for rearranging read image data in proper order and recombining the image data.

SUMMARY OF THE INVENTION

Embodiments of the present invention are directed to an image reading apparatus, an image reading method, and an image reading program that are configured to assign order to image data of a document that are input and read in random order, rearrange the image data in proper order, and generate a new document that is arranged in proper order.

According to one embodiment of the present invention, an image reading apparatus is provided that includes:

an image data acquiring unit configured to acquire document image data including more than one set of page image data;

an image reading unit configured to read an image located at a predetermined page position from the acquired set of page image data;

a conversion unit configured to recognize the read image of the predetermined page position and convert the recognized image into text data; and an order assigning unit configured to assign page number order to the set of page image data according to value information represented by the converted text data.

According to another embodiment of the present invention, an image reading method is provided that includes the steps of:

acquiring document image data including more than one set of page image data;

reading an image located at a predetermined page position from the acquired set of page image data;

recognizing the read image of the predetermined page position and converting the recognized image into text data; and assigning page number order to the set of page image data according to value information represented by the converted text data.

According to another embodiment of the present invention, a computer-readable program is provided that is run on a computer to execute the image reading method according to an embodiment of the present invention.

DESCRIPTION OF THE PREFERRED EMBODIMENTS

In the following, preferred embodiments of the present invention are described with reference to the accompanying drawings.

Figure 1:
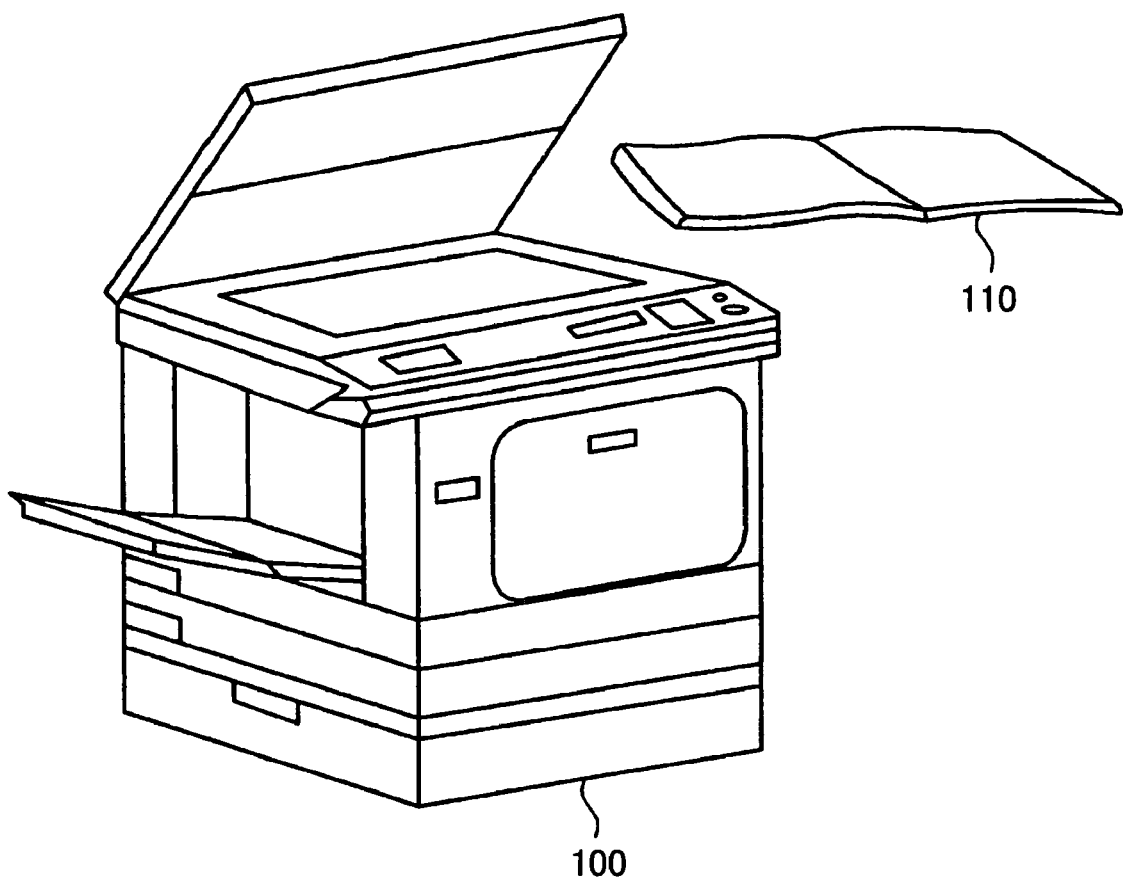
FIG. 1 is a diagram showing an overall configuration of an image reading apparatus according to an embodiment of the present invention.

FIG. 1 is a diagram showing a configuration of an image reading apparatus according to an embodiment of the present invention. The illustrated image reading apparatus may be used to scan a document 110, for example. Image data of the pages of the document 110 may be read to obtain image data of the document. However, it is noted that the pages may not necessarily be read in proper order. Accordingly, the image data of the pages may desirably be rearranged in proper order upon generating image data of the document 110.

Figure 2:
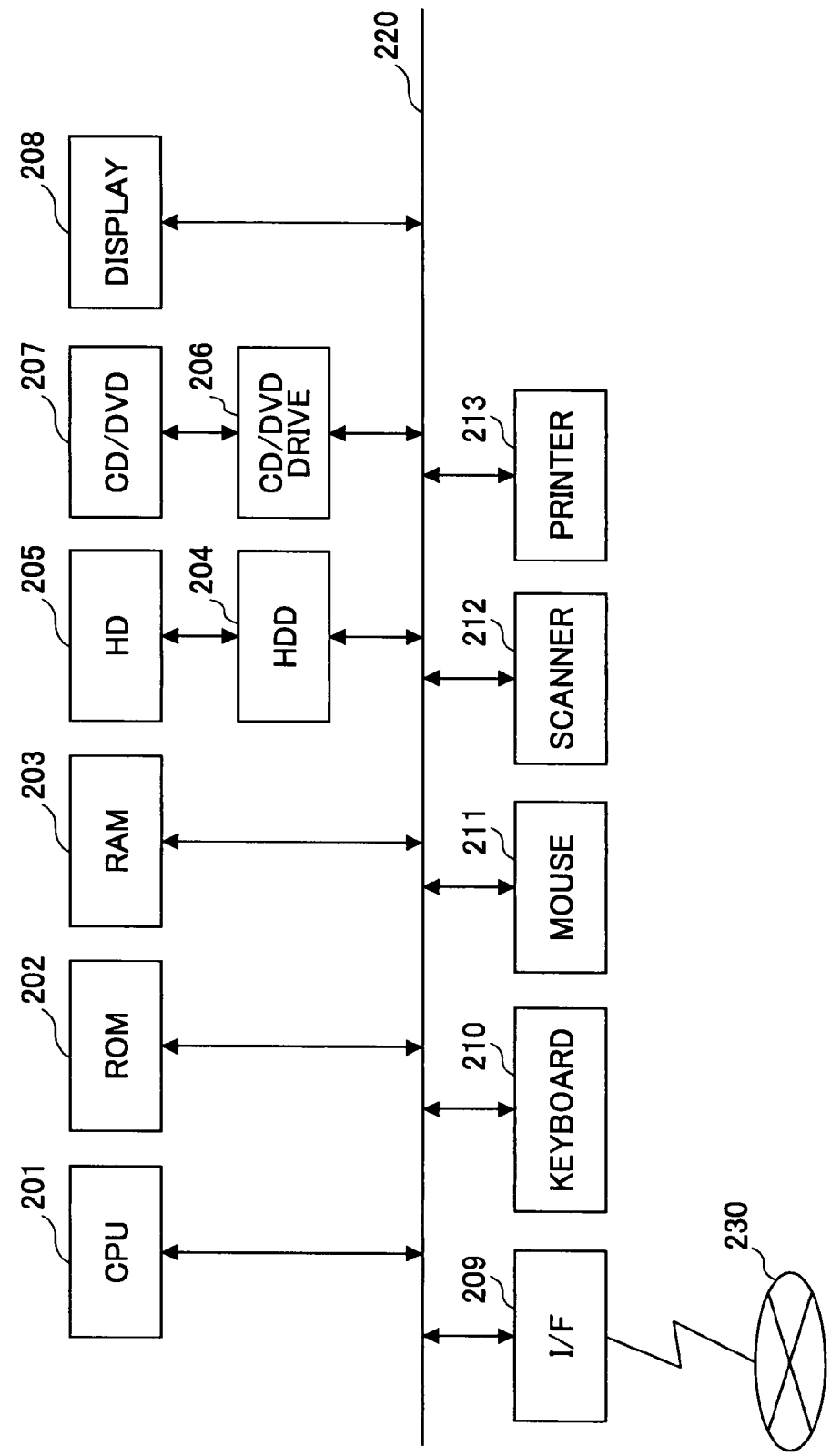
FIG. 2 is a block diagram showing an exemplary hardware configuration of an image reading apparatus according to an embodiment of the present invention.

FIG. 2 is a block diagram showing an exemplary hardware configuration of the image reading apparatus according to an embodiment of the present invention. In the illustrated example of FIG. 2, the image reading apparatus 100 includes a CPU (central processing unit) 201, a ROM (read only memory) 202, a RAM (random access memory) 203, a HDD (hard disk drive) 204, a HD (hard disk) 205, a CD/DVD drive 206, a CD/DVD 207, a display 208, an I/F (interface) 209, a keyboard 210, a mouse 211, a scanner 212, and a printer 213. Also, the above component elements 201-213 are interconnected by a bus 220.

The CPU 201 controls overall operations of the image reading apparatus 100. The ROM 202 stores various programs. The RAM 203 is used as a working area for the CPU 201. The HDD 204 controls reading/writing of data on the HD 205 in accordance with control command signals from the CPU 201. The HD 205 stores data that are written thereon by the HDD 204. The CD/DVD drive 206 controls reading/writing of data on the CD/DVD 207 in accordance with control command signals from the CPU 201.

The CD/DVD 207 stores data written thereon by the CD/DVD drive 206 and may be detached from the image reading apparatus 100. The CD/DVD 207 as an attachable storage medium may correspond to a CD-ROM (CD-R, CD-RW) or a DVD (digital versatile disk), for example. In other embodiments, a FD (flexible disk), a MO (magneto-optic disk), or a memory card may be used as the detachable medium, for example. The display 208 may be a TFT (thin film transistor) liquid display, a CRT (cathode ray tube), or a plasma display, for example.

The I/F 209 functions as an interface of the image reading apparatus 100 and may be connected to a network 203 such as a phone line, the Internet, or a local area network via a communication line. The I/F 209 controls input/output of data to/from a terminal.

The keyboard 210 and mouse 211 are used for inputting/setting data to the image reading apparatus 100. The scanner 21 optically reads image information. The printer 213 may be a laser printer or an inkjet printer that prints image information, for example.

Figure 3:
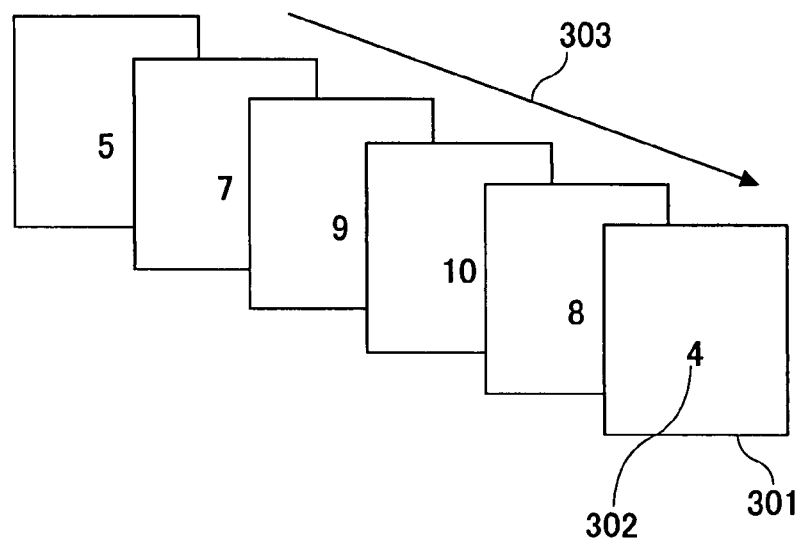
FIG. 3 is a diagram illustrating a process of reading image data of pages of a document.

FIG. 3 is a diagram illustrating an exemplary process for reading image data of a document. In the illustrated example, image data of six pages that are in random order are read, namely, pages 5, 7, 9, 10, 8, and 4 are read in this order. The image data of the pages include corresponding page numbers. That is, a page number 302 is written in each set of image data 301 so that the page number 302 may be read when the image data 301 are read. In the illustrated example, image data of the pages are successively read along the direction of arrow 303.

Figure 4:
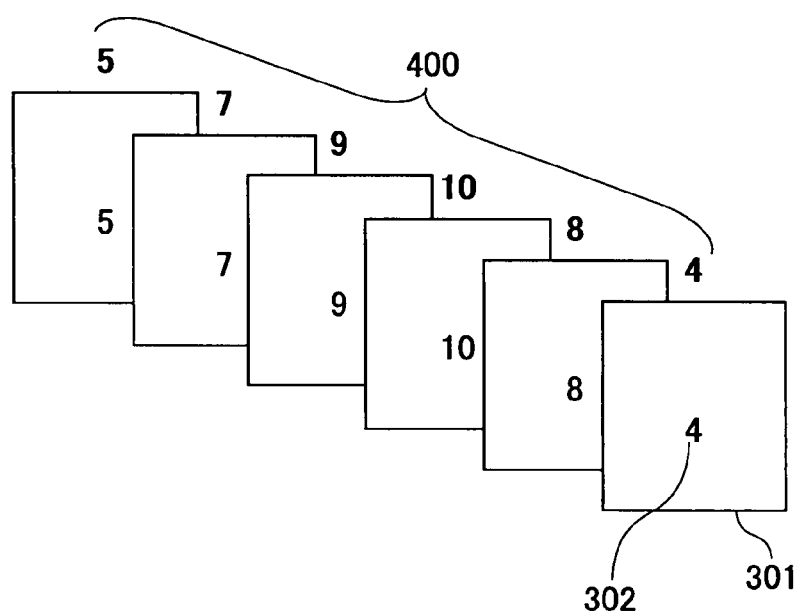
FIG. 4 is a diagram illustrating how the image data are arranged after reading the document.

FIG. 4 is a diagram illustrating how the image data are arranged after reading the pages. At this stage, the image data 301 and page number 302 of each page are read, and character recognition is performed on the read page number 302. The number identified by the character recognition is assigned to the corresponding image data 301 as page number information. Specifically, the page numbers 302 of the image data 301 of the read pages may be identified as pages numbers 5, 7, 9, 10, 8, and 4 (from the left side) in the illustrated example, and in turn, page number order information 400 is assigned to the read pages.

Figure 5:
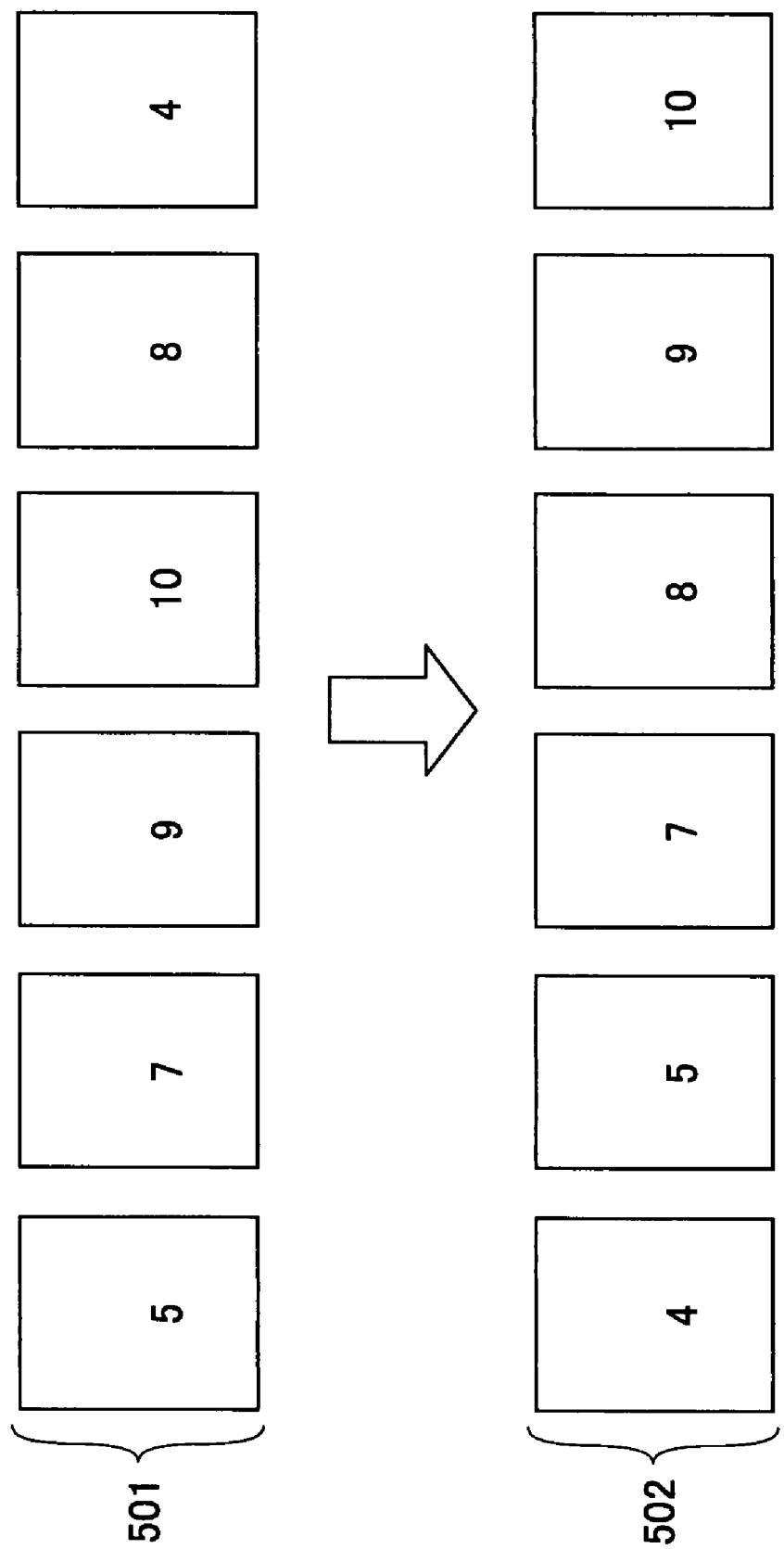
FIG. 5 is a diagram illustrating a process of rearranging the image data in proper order after reading the page numbers of the pages.

FIG. 5 is a diagram illustrating a process of rearranging the image data after the page numbers are read. As is described above in relation to FIG. 4, the page numbers 302 of image data 301 are read, but at this point, the image data 301 are not yet arranged in proper order according to their corresponding page numbers as is illustrated by arrangement 501 where the image data 301 of pages 5, 7, 9, 10, 8, 4 are arranged in this order. Since the page numbers 302 of the image data 301 are recognized, the image data 301 may be rearranged in proper order based on the recognized page number information assigned to the image data 301 as is illustrated by arrangement 502. Specifically, in arrangement 502, the image data 301 of pages 4, 5, 7, 8, 9, and 10 are arranged in this order.

Figure 6:
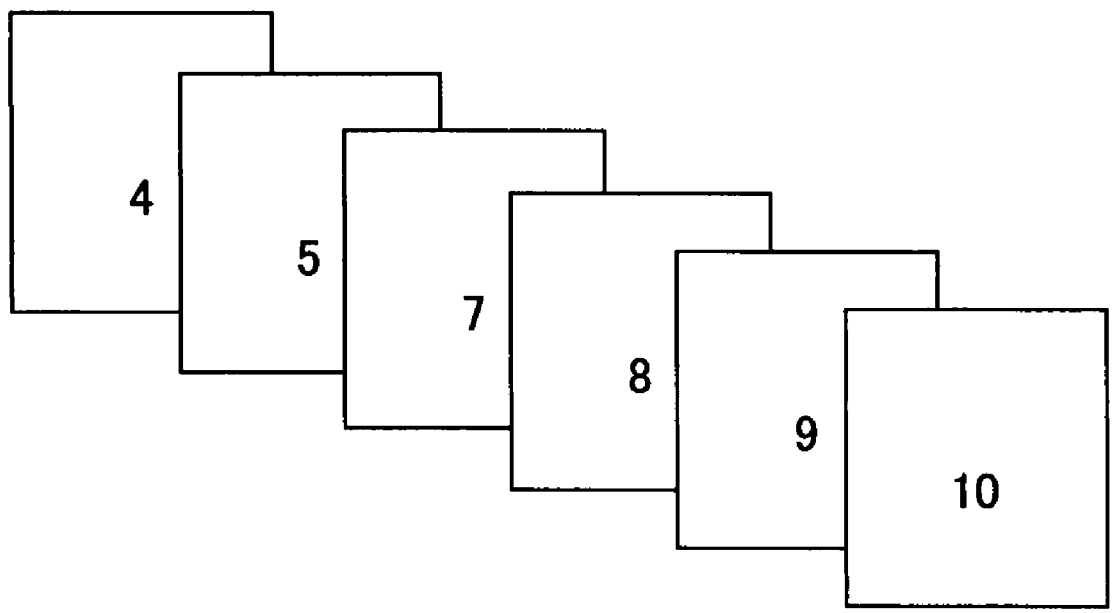
FIG. 6 is a diagram illustrating a process of recombining the rearranged image data.

FIG. 6 is a diagram illustrating how the rearranged image data are recombined. As is described above in relation to FIG. 5, the image data 301 are rearranged in proper order as is illustrated by arrangement 502, but at this point, the image data 301 are not yet compiled into one document file. Thus, the image data 301 of pages 4, 5, 7, 8, 9, and 10 arranged in this order have to be combined and stored as a new set of image data.

In the above-described example, it is assumed that the page number of each page is located at the same position. However, in certain types of documents such as a book, the position of page numbers may be different depending on whether the page is an odd-numbered page or an even-numbered page, for example. Specifically, in a case where the page number of a book is arranged to be positioned at the outer edge of a page, odd page numbers and even page numbers may be located at opposite sides. When character recognition of page numbers is performed without taking such a factor into consideration, only page numbers located on one side may be recognized while page numbers located on the other side may not be recognized. Or in another example, character recognition may be completely off target so that page numbers may not be recognized at all from any of the pages. However, performing character recognition on the entire image data of each page to recognize the page number may be inefficient and impractical. Thus, in a preferred embodiment, differing character recognition positions are designated for an odd-numbered page and an even-numbered page.

Figure 7:
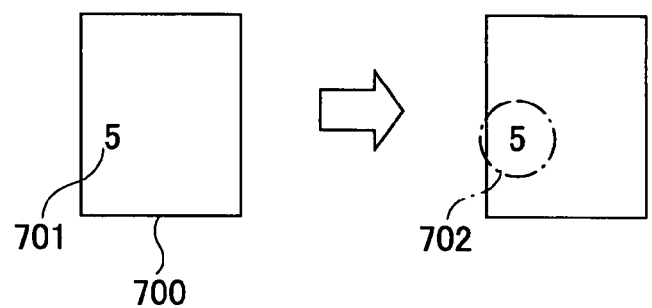
FIG. 7 is a diagram illustrating a process of recognizing image data of an odd page number.

FIG. 7 is a diagram illustrating a process of recognizing image data of an odd page number. In the illustrated example, a page number 701 is written in image data 700 subject to image reading. Since page numbers are located at different positions depending on whether the page is an odd-numbered page or an even-numbered page, it is first assumed that the page number 701 is an odd number. Accordingly, character recognition position 702 for an odd page number is read and character recognition is performed thereon to recognize page number 701. In this way, the page number 701 of the image data 700 may be identified as page 5.

Figure 8:
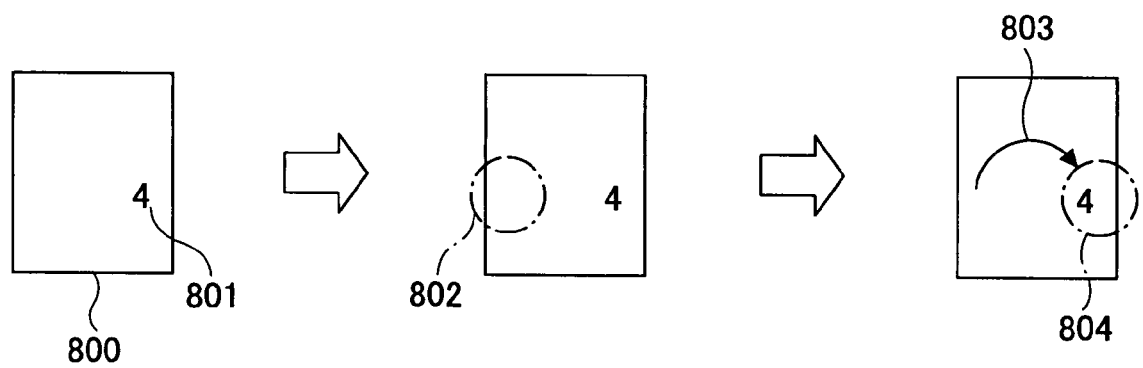
FIG. 8 is a diagram illustrating a process of recognizing image data of an even page number.

FIG. 8 is a diagram illustrating a process of recognizing image data of an even page number. In this illustrated example, a page number 801 is written in image data 800 subject to image reading. As in the example of FIG. 7, the page number 801 is first assumed to be an odd number. Accordingly, character recognition position 802 for an odd page number is read and character recognition is performed thereon. However, since the page number 801 is not located at this position 802, no page number is recognized. In such a case, it is assumed that the page number 801 is an even number, and the character recognition position 802 is moved along arrow 803 to character recognition position 804 for an even page number so that character recognition may be performed thereon. Thus, the page number 801 is recognized from character recognition position 804. In this way, the page number 801 of the image data 800 may be identified as page 4.

Figure 9:
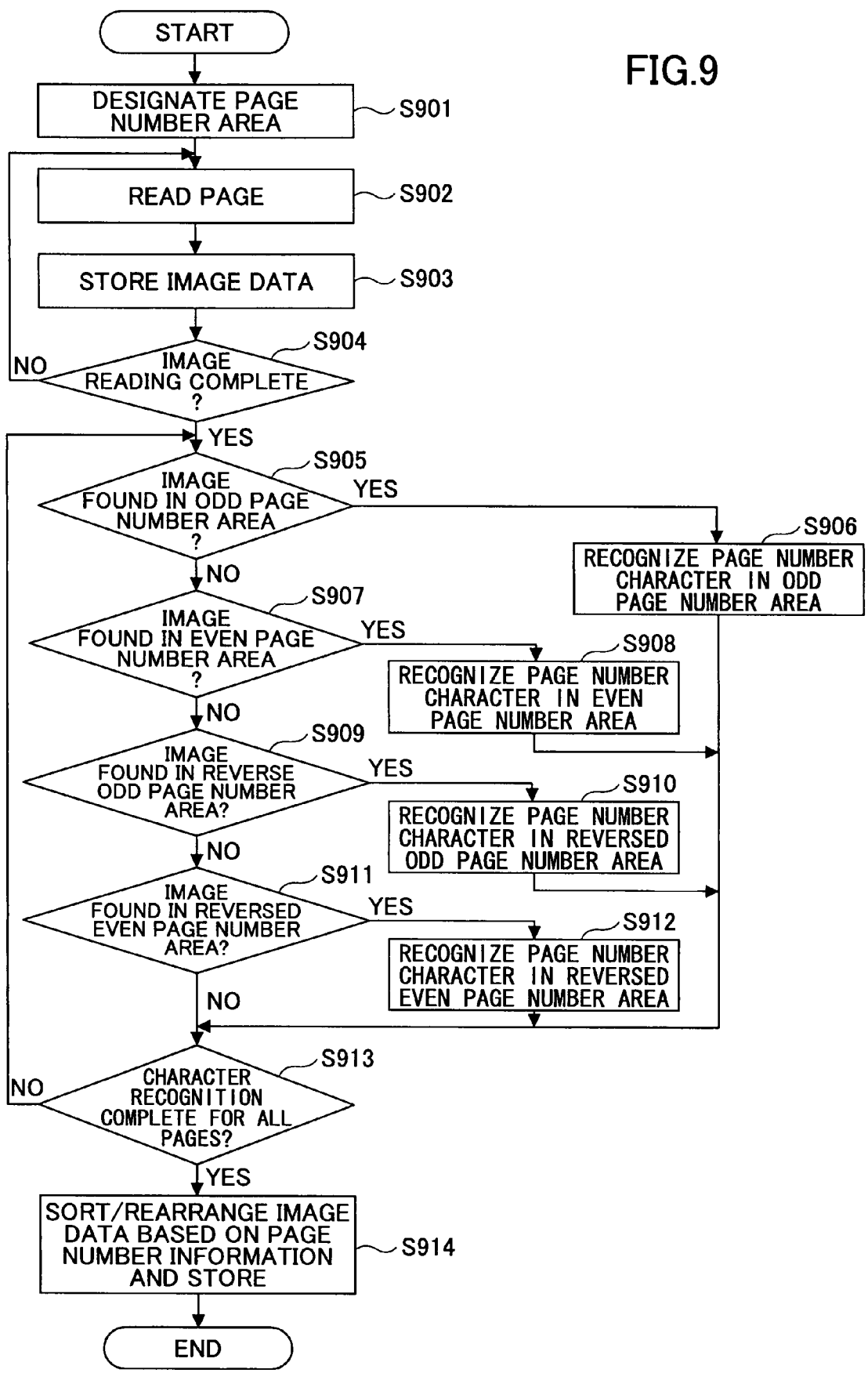
FIG. 9 is a flowchart illustrating a process sequence of reading, recognizing, and rearranging image data.

FIG. 9 is a flowchart illustrating an image reading process sequence that involves reading, recognizing, and rearranging image data. In this process, first, information on a page number area is specified (step S901). For example, information on the page number area may be specified by designating whether the image data represent a single page or two facing pages, whether a page number is located at the center, whether an odd page number is located at the right side or the left side, and whether the odd page number is positioned at an upper side or a lower side.

Then, image data of a page are read (step S902). Specifically, an image is read from the specified page number area. Then, the read image data are stored (step S903). After storing the read image data, a determination is made as to whether image data have been read for all the relevant pages (step S904). If image reading for all the pages is not yet complete (step S904, NO), the process goes back to step S902 in order to complete reading of the image data of all pages.

If it is determined that the image data of all pages have been read (step S904, YES), a determination is made as to whether an image exits within an odd page number area (step S905). If an image exits within the odd page number area (step S905, YES), namely, if a page number is found in this area, page number character recognition is performed on this odd page number area (step S906) and the process moves on to step S913.

If an image does not exist within the odd page number area (step S905, NO), a determination is made as to whether an image exists in an even page number area (step S907). If an image exists within the even page number area (step S907, YES), namely, if a page number is found in this area, page number recognition is performed on this even page number area (step S908) and the process moves on to step S913.

If an image does not exist within the even page number area (step S907, NO), a determination is made as to whether an image exists within a reversed odd page number area (step S909). If an image exists within the reversed odd page number area (step S909, YES), namely, if a page number is found in this area, page number character recognition is performed on this reversed odd page number area (step S910) and the process moves on to step S913.

If an image does not exist within the reversed odd page number area (step S909, NO), a determination is made as to whether an image exists within a reversed even page number area (step S911). If an image exists within this area (step S911, YES), namely, if a page number is found in this area, page number character recognition is performed on this reversed even page number area (step S912) and the process moves on to step S913.

If an image does not exist within the reversed even page number area (step S911, NO), a determination is made as to whether character recognition has been performed on all pages (step S913). If character recognition has not been performed on all pages (step S913, NO), the process goes back to step S905. If character recognition has been performed on all pages (step S913, YES), image data of the pages are sorted and rearranged in proper order based on the page number information to be stored (step S914) after which the process sequence is ended.

Figure 10:
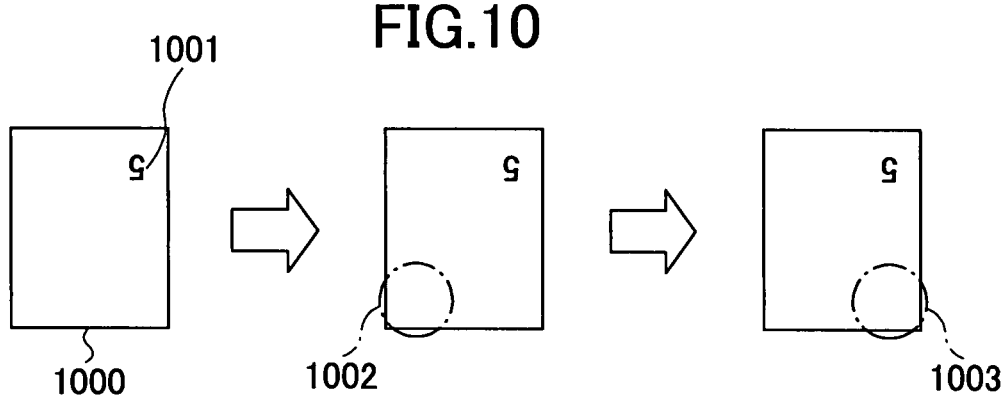
FIG. 10 is a diagram illustrating a process of reading a page number area from image data of an odd-numbered page as is read.

FIG. 10 is a diagram illustrating a process of reading image data of an odd-numbered page. In the illustrated example, a page number 1001 is written in image data 1000 subject to image reading. As in FIG. 7, first it is assumed that the page number 1001 is an odd page number upon performing character recognition. Thus, character recognition position 1002 is read and character recognition is performed thereon. However, since a page number cannot be found in this position 1002, it is then assumed that the page number 1001 is an odd page number. Thus, character recognition position 1003 is read and character recognition is performed thereon. However, a page number cannot be found in this position 1003 either.

Figure 11:
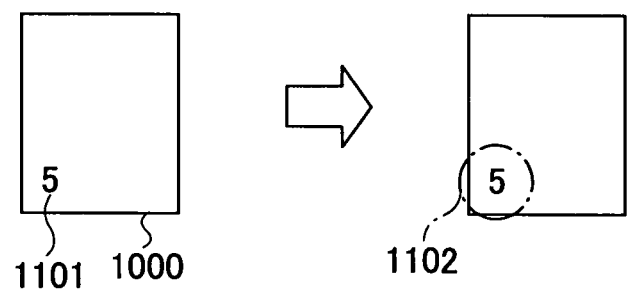
FIG. 11 is a diagram illustrating a process of reading a page number area from image data of the odd-numbered page turned upside down.

FIG. 11 is a diagram illustrating a process of reading image data of the odd-numbered page turned upside down. Specifically, after performing character recognition on the character recognition positions 1002 and 1003 in FIG. 10, the image data 1000 are turned upside down (reversed) to obtain image data 1100 having a page number 1101 written therein. Then, as in FIG. 10, it is assumed that the page number 1101 is an odd page number, and character recognition position 1102 is read to perform character recognition thereon. In this case, the page number 1101 is recognized at position 1102. In this way, the page number 1101 of the image data 1100 may be identified as page 5.

Figure 12:
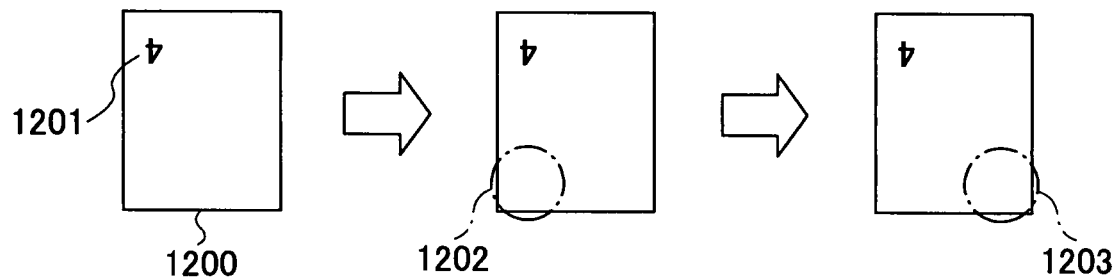
FIG. 12 is a diagram illustrating a process of reading a page number area from image data of an even-numbered page as is read.

FIG. 12 is a diagram illustrating a process of reading image data of an even-numbered page. In the illustrated example, a page number 1201 is written in image data 1200 subject to image reading. As in the example of FIG. 7, first it is assumed that the page number 1201 is an odd page number. Thus, character recognition position 1202 for an odd page number is read and character recognition is performed thereon. However, since the page number 1201 is not recognized from this position 1202, it is then assumed that the page number 1201 is an even page number. Thus, character recognition position 1203 for an even page number is read and character recognition is performed thereon. However, the page number 1201 is not recognized from this position 1203 either.

Figure 13:
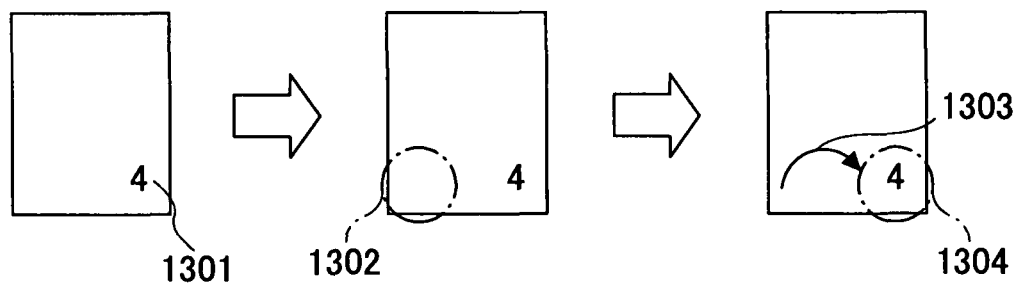
FIG. 13 is a diagram illustrating a process of reading a page number are from image data of the even-numbered page turned upside down.

FIG. 13 is a diagram illustrating a process of reading image data of the even-numbered page turned upside down. After character recognition is performed on positions 1202 and 1203 in FIG. 12, the image data 1200 are turned upside down (reversed) to obtain image data 1300 having a page number 1301 written therein. Then, as in FIG. 12, it is first assumed that the page number 1301 is an odd page number. Accordingly, character recognition position 1302 for an odd page number is read and character recognition is performed thereon. However, the page number 1301 is not recognized from this position 1302 so that the page number 1301 is then assumed to be an even page number. Accordingly, the character recognition position is moved in the direction indicated by arrow 1303 to position 1304, and the page number 1301 is recognized from this position 1304. In this way, the page number 1301 of the image data 1300 may be identified as page 4.

As can be appreciated from the above descriptions, when image data read from a page are turned upside down (reversed), the image data are reversed after confirming that an image (page number) cannot be recognized from the image data in its original orientation and page number character recognition is performed on the reversed image data. In this example, image data may be rearranged in proper order based on their page number information regardless of the orientation in which the image data are read.

It is noted that the above-described example illustrates a case of reading image data that are reversed vertically (i.e., turned upside down); however, in other examples, image data may be turned sideways. In one embodiment, an image of a page number may be read from one of four corner positions of image data subject to image reading, and the image of the page number may be rotated according to its orientation so that the page number may be successfully recognized, for example.

In the following, a page number character recognition process that involves such image rotation is described. In this process, as in FIGS. 10 and 12, first, an odd page number area (e.g., position 1002 and position 1202) and an even page number area (e.g., position 1003 and position 1203) are read. Then, when an image (page number) is not recognized from any of these areas, a next process as is illustrated in FIGS. 14 and 15 is performed instead of the process of reversing the image data as is illustrated in FIGS. 11 and 13.

Figure 14:
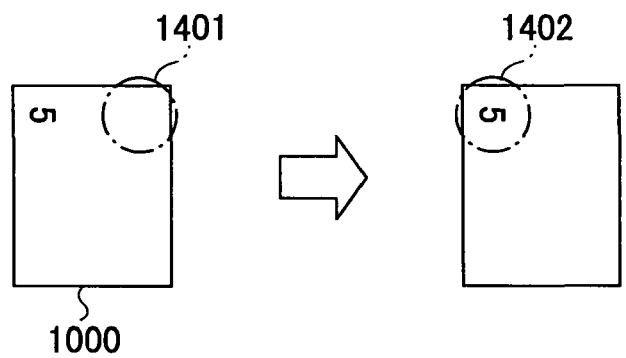
FIG. 14 is a diagram illustrating a process of reading an upper section of image data of a page.

FIG. 14 is a diagram illustrating a process of reading an upper portion of image data. Specifically, after reading a lower portion of image data as is described above, the process moves on to read an upper portion of image data 1000. It is noted that the position of a page number varies depending on whether the page number is an odd page number or an even page number. Therefore, at first, it is assumed that the page number to be recognized is an odd page number. Accordingly, position 1401 for an odd page number is read. However, since a page number cannot be read from position 1401, the page number to be recognized is then assumed to be an even page number. Accordingly, position 1402 for an even page number is read and a page number is read from this position 1402.

It is noted that at this point, the page number is not yet identified. That is, although image data of the page number are read, the page number is not yet recognized as page number information for determining the page order. In the present example, recognition of the page number is performed by rotating image data of the page number.

Figure 15:
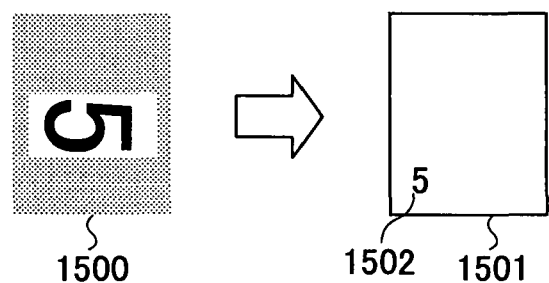
FIG. 15 is a diagram illustrating a page number recognition process involving image data rotation.

FIG. 15 is a diagram illustrating a page number recognition process involving image rotation. In FIG. 14, image data of a page number is read from position 1402. If the page number is properly oriented within the image data, the page number may be recognized from the image data as is read. However, if the page number is turned upside down or sideways, the page number may not be properly recognized. Accordingly, in the present example, character recognition is successively performed on image data of position 1402 in its original orientation, in a reversed orientation, in a 90-degree-rotated orientation, and in a 270-degree-rotated orientation. A character properly recognized from one of these character recognition processes is identified as the page number of the image data.

Specifically, FIG. 15 illustrates a case in which page number 1500 (in the form of image data) is read from position 1402. As is shown in this drawing, the character of page number 1500 is not properly oriented (i.e., turned to the right). First, character recognition is performed on page number 1500 in its original orientation. However, a character cannot be properly recognized from page number 1500 since the character is turned sideways. Then, character recognition is performed on image data of the page number 1500 in a reversed orientation. However, a character cannot be properly recognized from the reversed image data either.

Then, character recognition is performed on image data of the page number 1500 rotated clockwise by 90 degrees. However, a character cannot be properly recognized from the 90-degree-rotated image data since the character is turned upside down in this case. Then, character recognition is performed on image data of the page number 1500 rotated clockwise by 270 degrees, namely, rotated counterclockwise by 90 degrees. In this case the number '5' may be recognized from the image data and the page number 1500 may be recognized as page 5. In turn, the image data 1000 is rotated clockwise by 270 degrees to obtain image data 1501 having a properly oriented page number 1502 written therein.

As can be appreciated from the above descriptions, according to an embodiment of the present invention, page numbers may be read, recognized, and used for rearranging image data in proper order regardless of whether the image data are properly oriented, turned upside down, or turned sideways.

It is noted that the above-described examples relate to reading a single page of a document and performing character recognition thereon. However, there may be cases in which two facing pages of a document are read at once and character recognition is performed thereon. In the following, a character recognition process that is performed in such a case is described.

Figure 16:
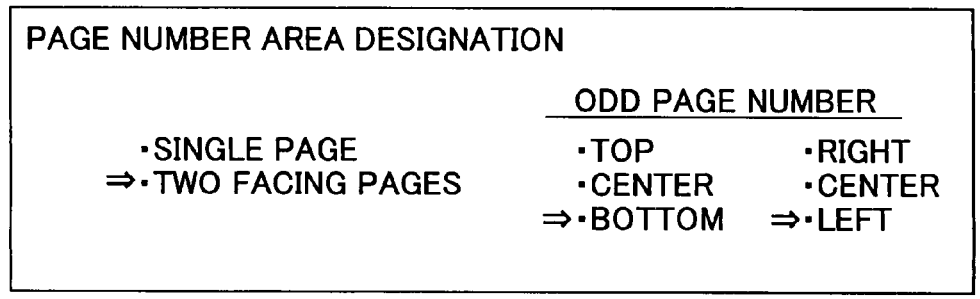
FIG. 16 is a diagram showing a designation screen for specifying a page number area.

FIG. 16 is a diagram showing an exemplary designation screen for specifying information on a page number area. In the illustrated example, first, a designation is made as to whether single-page reading or double-page reading is performed. In this case, double-page reading is designated. Then, the page number area of an odd page number is designated. It is noted that the illustrated screen portion for designating the page area number is displayed when double-page reading is designated; however, a similar screen portion may be displayed when single-leaf reading is designated as well. In the present example, a designation is made as to whether the page number area of the odd page number is located at the top, center, or bottom of a page ('bottom' is designated in FIG. 16). Then, a designation is made as to whether the page number area is located at the right side, center, or left side ('left' is designated in FIG. 16).

Figure 17:
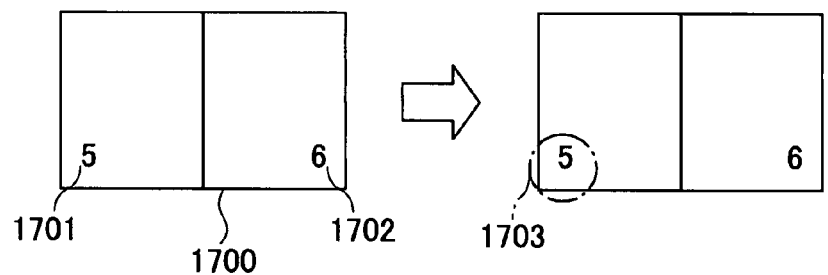
FIG. 17 is a diagram illustrating a process of reading a page number area from image data of two facing pages oriented in a proper direction.

FIG. 17 is a diagram illustrating a process of recognizing the page numbers of two facing pages that are properly oriented. In the illustrated example, image data 1700 is subject to the present process. Image data 1700 includes page numbers 1701 and 1702. Since the lower left hand side area of two facing pages is designated as the page number area in FIG. 16, image data of position 1703 is read. In turn, the page number 1701 is recognized from position 1703. In this way, the page number 1701 at the lower left hand side of the image data 1700 may be identified as page 5. It is noted that the page number 1702 at the lower right hand side may be identified as page 6 without performing character recognition on the relevant position since it is known that the page number 1702 is that coming right after page number 1701.

Figure 18:
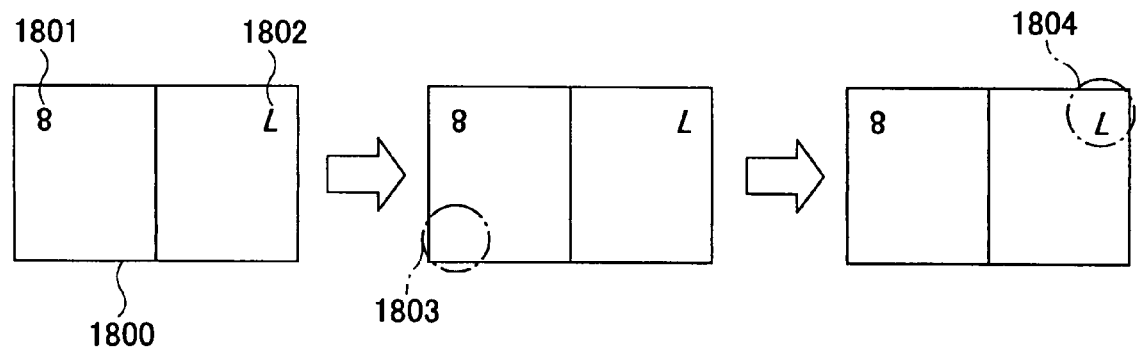
FIG. 18 is a diagram illustrating a process of reading a page number area from image data of two facing pages turned upside down.

FIG. 18 is a diagram illustrating a process of reading and recognizing an image from image data of two facing pages turned upside down. In this process, first a page number recognition process is performed on image data 1800. The image data 1800 includes page numbers 1801 and 1802. Since it is designated in FIG. 16 that the lower left hand side area of two facing pages corresponds to the page number area, image reading is performed on position 1803 at the lower left hand side of image data 1800. However, since no image (page number) can be read from position 1803, the process moves on to performing image reading on position 1804 at the upper right hand side of image data 1800 corresponding to the position 1803 turned upside down. In this case, the page number 1802 can be read from position 1804 so that the process moves on to character recognition of the page number 1802.

In the present example, since the image data 1800 is turned upside down, the page number 1802 is also turned upside down so that the page number (character) may not be properly recognized from the image data of page number 1802 in its original orientation. Accordingly, character recognition is performed on image data of page number 1802 oriented in four different directions as in the example of FIG. 15.

Figure 19:
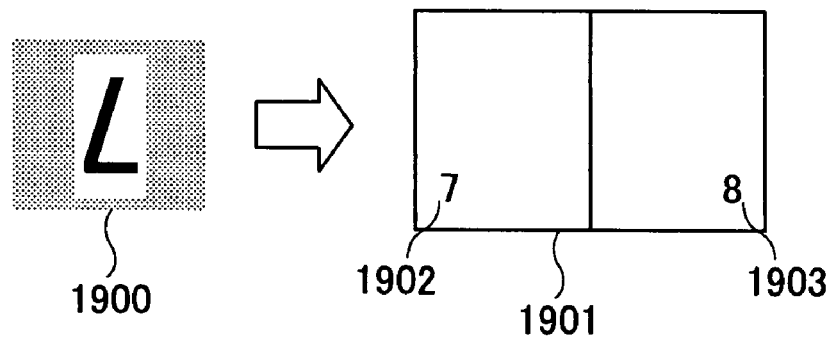
FIG. 19 is a diagram illustrating a process of recognizing a page number from image data of two facing pages.

FIG. 19 is a diagram illustrating a process of recognizing a page number from image data of two facing pages. As is described in relation to FIG. 15, when image data of a page number are turned upside down or sideways, the page number (character) may not be properly recognized from the image data as is read. Accordingly, character recognition is successively performed on image data of position 1804 in its original orientation, in an upside down orientation, in a 90-degree rotated orientation, and in a 270-degree rotated orientation so that a character may be properly recognized from the character recognition process, and such a character is identified as page number information of the image data.

Specifically, in FIG. 19, page number 1900 (in the form of image data) is not oriented in a proper direction (i.e., is turned upside down). First, character recognition is performed on page number 1900 in its original orientation. However, a character is not properly recognized from page number 1900 since it is not oriented in the proper direction. Then, character recognition is performed on image data of page number 1900 turned upside down. As a result, the number '7' is recognized from the upside down image data, and the page number 1900 is identified as page 7. Thus, it may be determined that image data 1800 represents an image of pages 7 and 8 of a document.

The image data 1800 is then turned upside down to obtain image data 1901 having page numbers 1902 and 1903 corresponding to page numbers 1802 and 1801 oriented in the proper direction. It is noted that in the above-described example, the page number 1900 is turned upside down; however, there may be cases in which image data of a page number is turned sideways as well. In such cases, a character may not be properly recognized from image data of the page number turned upside down. Accordingly, character recognition is performed on image data of the page number rotated clockwise by 90 degrees. When a character is not properly recognized from such image data, character recognition is performed on image data of the page number rotated clockwise by 270 degrees.

Figure 20:
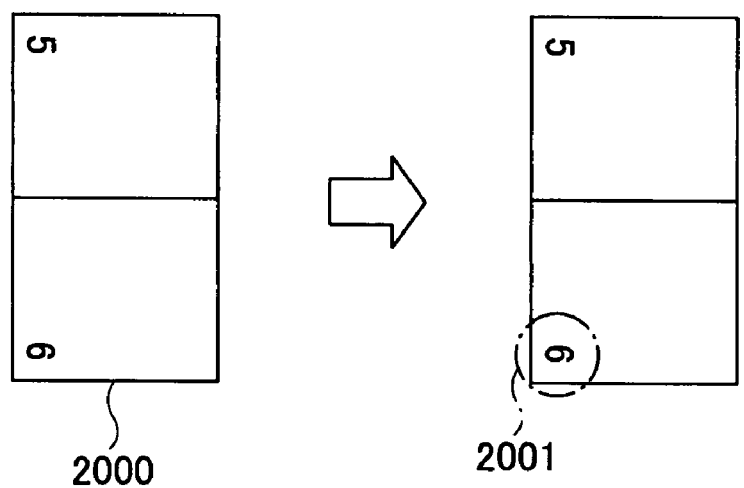
FIG. 20 is a diagram illustrating a process of reading a page number area from image data of two facing pages turned sideways.

FIG. 20 is a diagram illustrating a process of reading and recognizing image data of two facing pages that are turned sideways. In this process, first, a recognition process is performed on image data 2000. Since the page number area is designated to be at the lower left hand side of two facing pages, image reading is performed on position 2001. In this case, an image can be read from position 2001. However, since the read image data 2100 are turned sideways, a page number (character) may not be properly recognized from the image data 2100 as is read. Accordingly, character recognition is performed on image data of the page number oriented in different directions as is described in relation to FIGS. 15 and 19.

Figure 21:
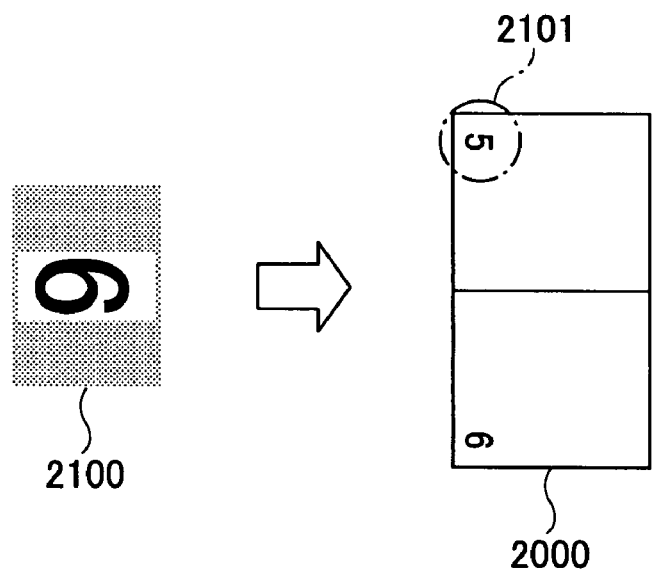
FIG. 21 is a diagram illustrating a process of recognizing an even page number from image data of two facing pages turned sideways.

FIG. 21 is a diagram illustrating a process of recognizing the page number of an even-numbered page of two facing pages that are oriented sideways. In this process, character recognition is successively performed on image data of position 2001 in its original orientation, in an upside down orientation, in a 90-degreee rotated orientation, and in a 270-degree rotated orientation, and a character that is properly recognized from the image data is identified as a page number. In FIG. 21, the character of page number 2100 is not oriented in a proper direction (i.e., is turned to the right). First, character recognition is performed on the page number 2100 in its original orientation. However, a character cannot be properly recognized from page number 2100 since it is not oriented in the proper direction. Then, character recognition is performed on image data of the page number 2100 turned upside down. However, a character cannot be properly recognized from the upside down image either.

Then, character recognition is performed on image data of the page number 2100 rotated clockwise by 90 degrees in which case the number '6' may be recognized from the image data. On the other hand, when character recognition is performed on image data of the page number 2100 rotated clockwise by 270 degrees, the number '9' may be recognized from the image data. As can be appreciated, in the present case, two numbers '6' and '9' are recognized from the character recognition processes so that the page number cannot be identified. Thus, in such a case, character recognition is performed on position 2101.

Figure 22:
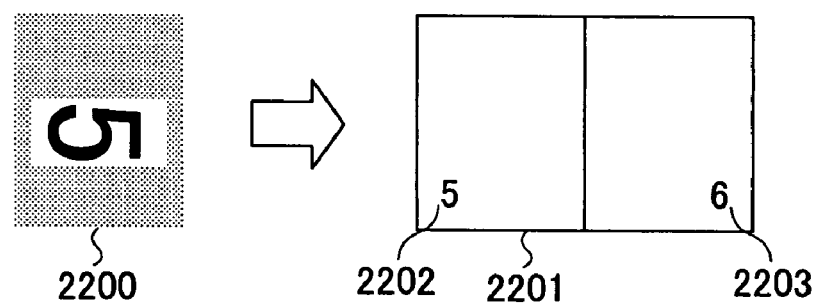
FIG. 22 is a diagram illustrating a process of recognizing an odd page number from image data of two facing pates turned sideways.

FIG. 22 is a diagram illustrating a process of recognizing the page number of an odd-numbered page of two facing pages that are turned sideways. In this process, character recognition is performed on image data of position 2101 in different orientations (i.e., original orientation, upside down, 90-degree rotation, 270-degree rotation) in a manner similar to that described above, and a character properly recognized in the character recognition processes is identified as a page number. First, character recognition is performed on page number 2200 as the image data of position 2101 in its original orientation. However, a character cannot be properly recognized since page number 2200 is not oriented in the proper direction. Then, character recognition is performed on image data of the page number 2200 turned upside down. However, a character is not properly recognized from the upside down image data either.

Then, character recognition is performed on image data of the page number 2200 rotated clockwise by 90 degrees. However, a character is not properly recognized in this case either. On the other hand, when character recognition is performed on image data of the page number 2200 rotated clockwise by 270 degrees, namely, rotated counterclockwise by 90 degrees, the number '5' may be recognized from the image data. As can be appreciated, only one character is recognized from the character recognition processes performed with respect to page number 2200. Specifically, the page number 2200 is identified as page number 5. Thus, the image data 2000 may be identified as an image of pages 5 and 6 as two facing pages of a document. In turn, the image data 2000 are rotated clockwise by 270 degrees to obtain image data 2201 having page numbers 2202 and 2203 oriented in the proper direction.

Figure 23:
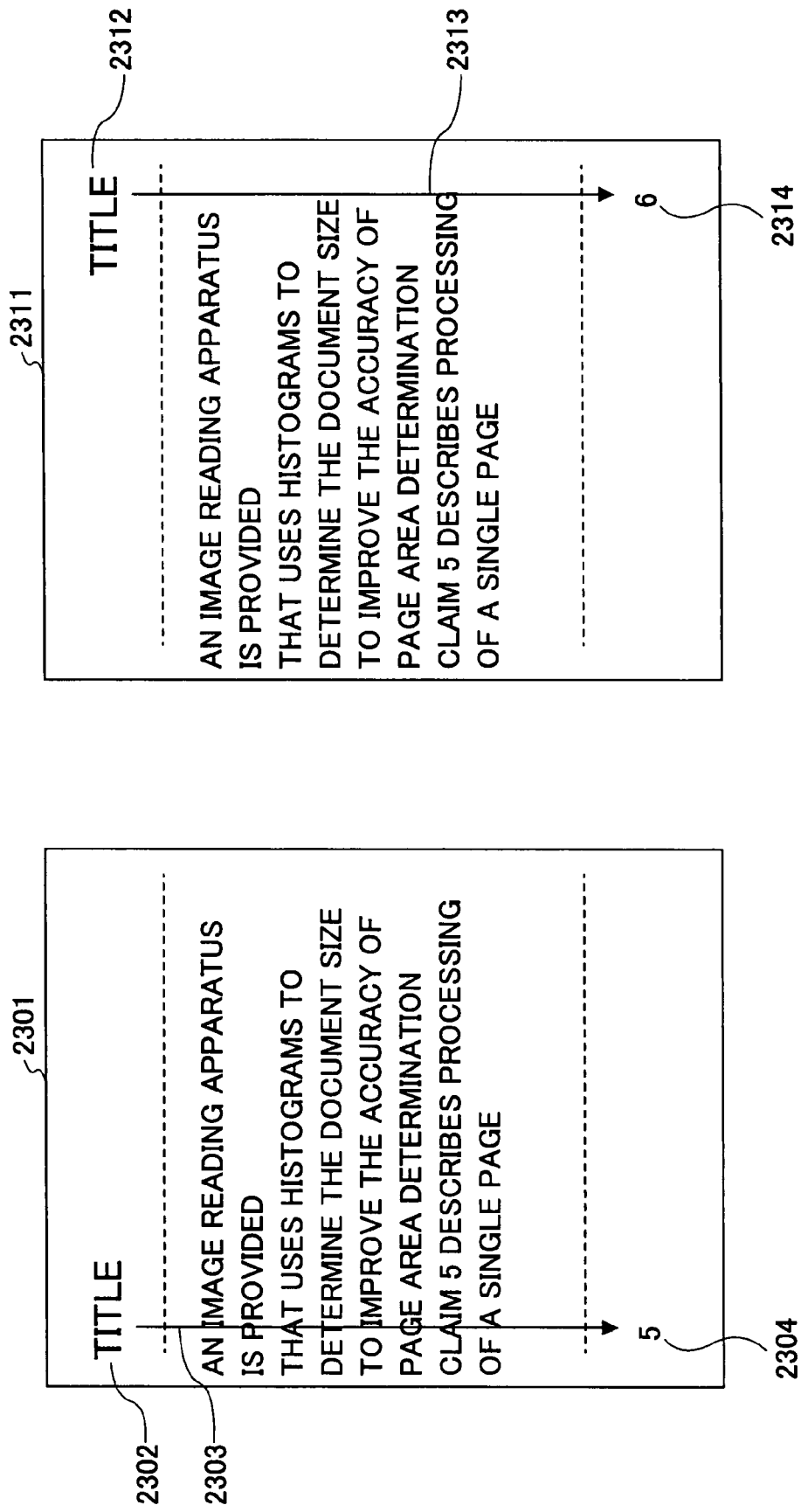
FIG. 23 is a diagram illustrating a process of identifying the direction of a page number based on the direction of a title of a page.

FIG. 23 is a diagram illustrating a process of identifying the direction of a page number based on the direction of a title. It is noted that the previously-described embodiments of the present invention involve performing character recognition on image data as is read, changing the orientation of image data of a page and performing character recognition thereon, or changing the orientation of image data of a page number character and performing character recognition thereon. In another embodiment, the direction of image data may be determined by determining the direction of a title and a page number may be identified based on the determined direction of the title.

Specifically, in the illustrated example of FIG. 23, image data 2301 includes a title 2302. By identifying this title 2302 upon reading the image data 2301, the direction of the image data 2301 may be determined. In turn, position 2304 may be located along arrow 2303. That is, by identifying the title 2302, it may be determined that the page number area is at position 2304. In turn, the page number '5' may be read and identified from position 2304.

It is noted that the above process relates to identifying the page number from the image data 2301 of an odd-numbered page. However, a similar process may be performed for identifying a page number from image data 2311 of an even-numbered page although the page number area of the even-numbered page may be located at a different position. Specifically, by reading the image data 2311, a title 2312 that is included therein may be identified and the direction of the image data 2311 may be determined. Then, position 2314 may be located along arrow 2313. That is, by identifying the title 2312, it may be determined that the page number area is at position 2314. Accordingly, page number '6' may be read and identified from position 2314.

Figure 24:
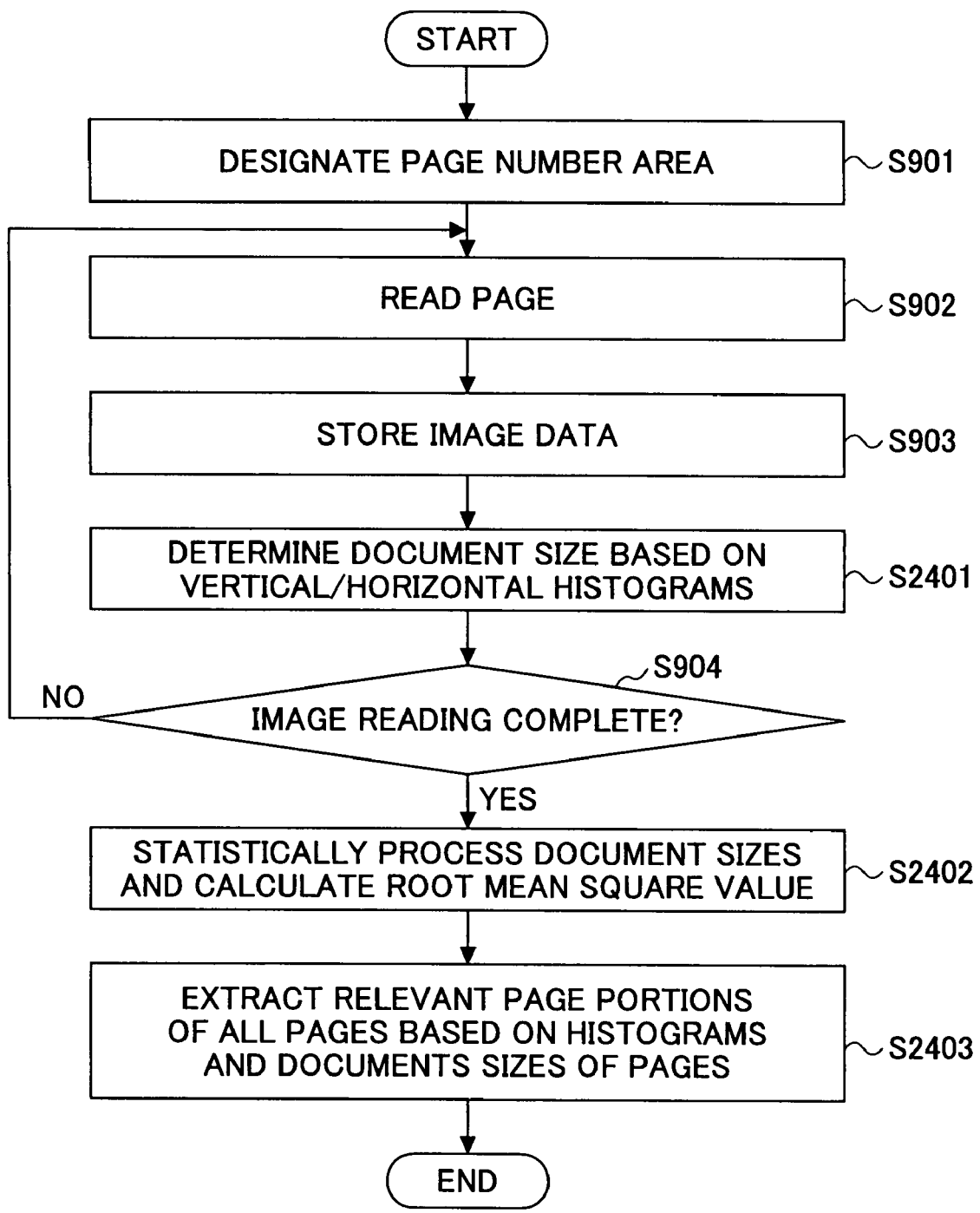
FIG. 24 is a flowchart illustrating a page number reading pre-process.

FIG. 24 is a flowchart illustrating an image reading process including a page number reading pre-process. The present pre-process may be performed before actually performing page number character recognition in the image reading process illustrated in FIG. 9 to improve the accuracy of the recognition process. Specifically, the present pre-process may be performed between steps S903 and S905 of FIG. 9.

In the process of FIG. 24, steps S901 through S903 are identical to the process of FIG. 9. Then, an original page size is determined based on vertical/horizontal histograms (step S2401). It is noted that this process is described in detail below with reference to FIG. 25. Then, a determination is made as to whether image data reading has been performed on all relevant pages (step S904) as in FIG. 9. If image data reading is not performed on all pages (step S904, NO), the process goes back to step S902 to complete image reading of all pages.

When image reading of all pages is complete (step S904, YES), the original page sizes of the pages are statistically processed to calculate a root mean square value (step S2402). It is noted that this process is described in detail below with reference to FIG. 27. Then, portions of all pages are extracted based on the histograms and calculated original page sizes of these pages (step S2403). This process is described in detail below with reference to FIG. 28. Then, the pre-process sequence may be completed and the process moves on to step S905 of FIG. 9.

Figure 25:
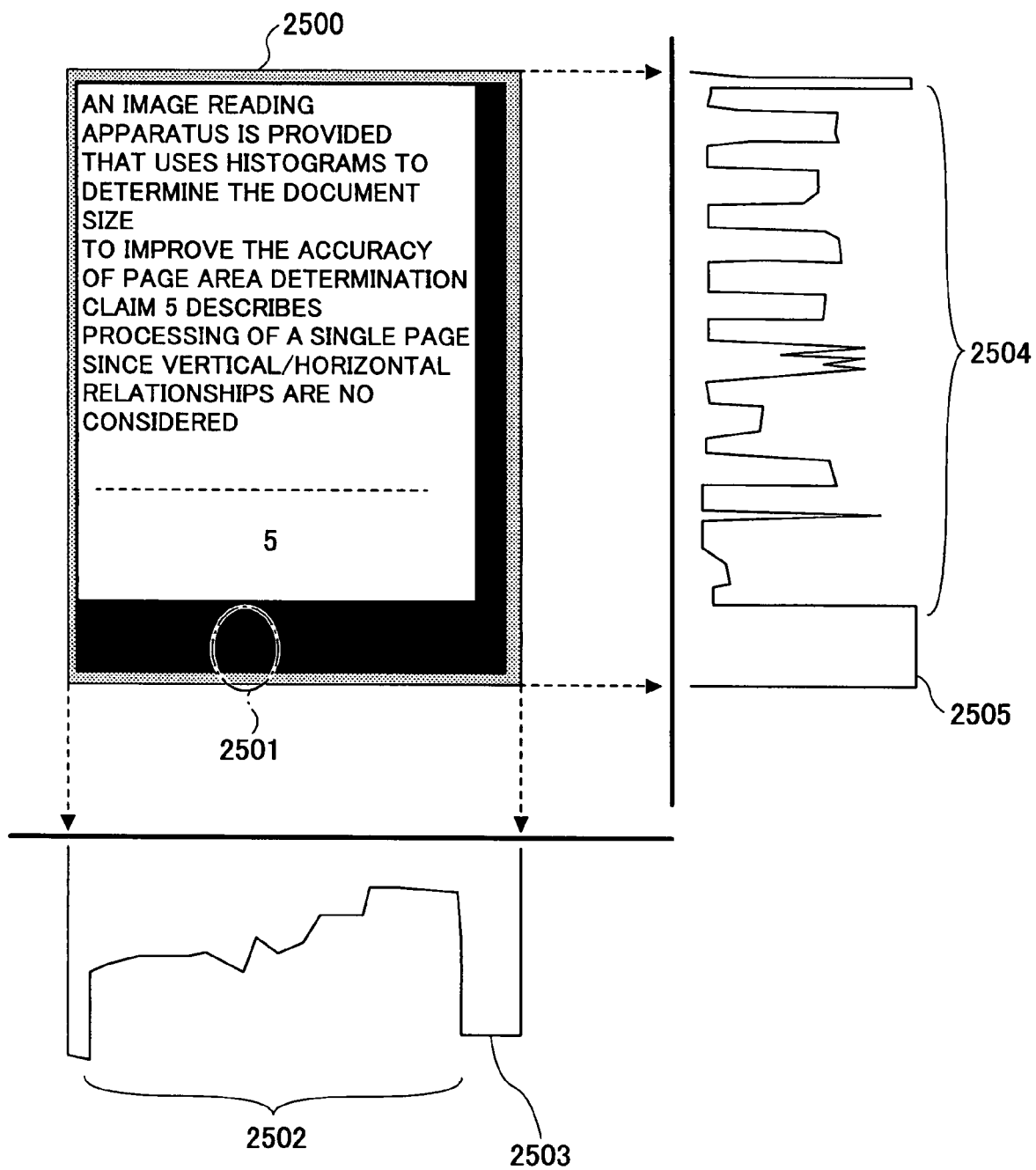
FIG. 25 is a diagram illustrating a process of determining an original page size based on histograms of image data.

FIG. 25 is a diagram illustrating the process of determining a original page size based on histograms. For example, in a case where the document subject to image reading is a copied document of an original document, the copied document may include black margins in when the original document is smaller than the copied document. In such a case, page numbers of the copied document may not be successfully read when the position of the page number area is uniformly set. Accordingly, in the present process, a relevant page portion is identified and the page number area is changed accordingly in order to improve the accuracy of the page number recognition process.

Specifically, image data 2500 includes black margins as described above so that a page number cannot be recognized from reading image data of position 2501. Accordingly, histograms of the image data 2500 are obtained. That is, with respect to the horizontal direction, a horizontal histogram 2502 of the image data 2500 is obtained so that a horizontal margin (side margin) 2503 may be determined based on changes in the horizontal histogram 2502. Similarly, with respect to the vertical direction, a vertical histogram 2504 of the image data 2500 is obtained so that a vertical margin (bottom margin) 2505 may be determined based on changes in the vertical histogram 2504. In this way, a original page size of the image data 2500 excluding the margins 2503 and 2505 (relevant page portion) may be determined, and the page number area 2501 may be moved to an appropriate position based on the determined original page size.

Figure 26:
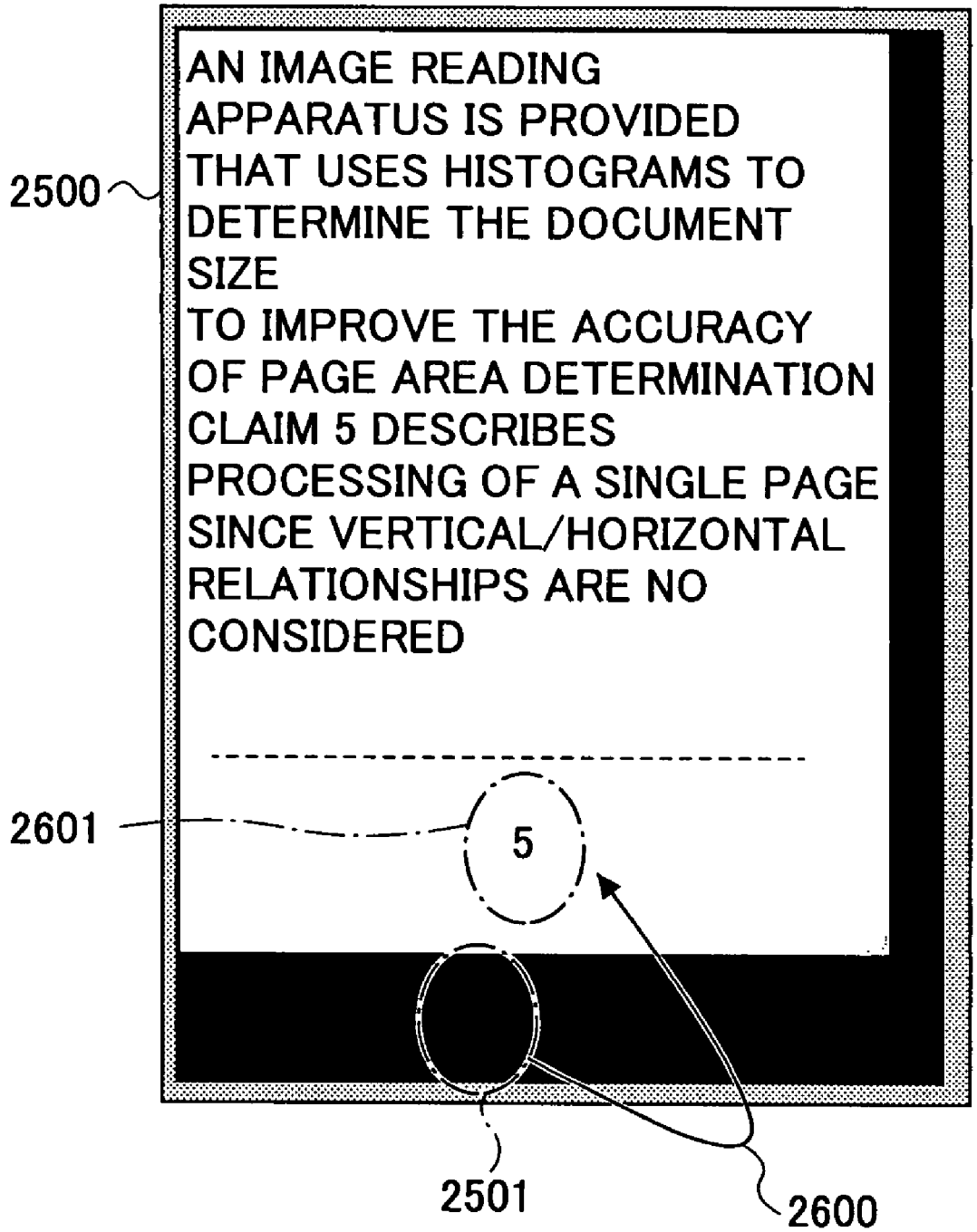
FIG. 26 is a diagram illustrating a process of moving a page number area.

FIG. 26 is a diagram illustrating a process of moving the page number area. It can be appreciated that a page number cannot be recognized from performing character recognition on the page number area 2501 when the existence of margins is determined based on the histograms as in FIG. 25. Thus, the page number area 2501 is moved to a new page number area 2601, and image reading and character recognition are performed on the new page number area 2601 so that a page number may be successfully read and recognized.

Figure 27:
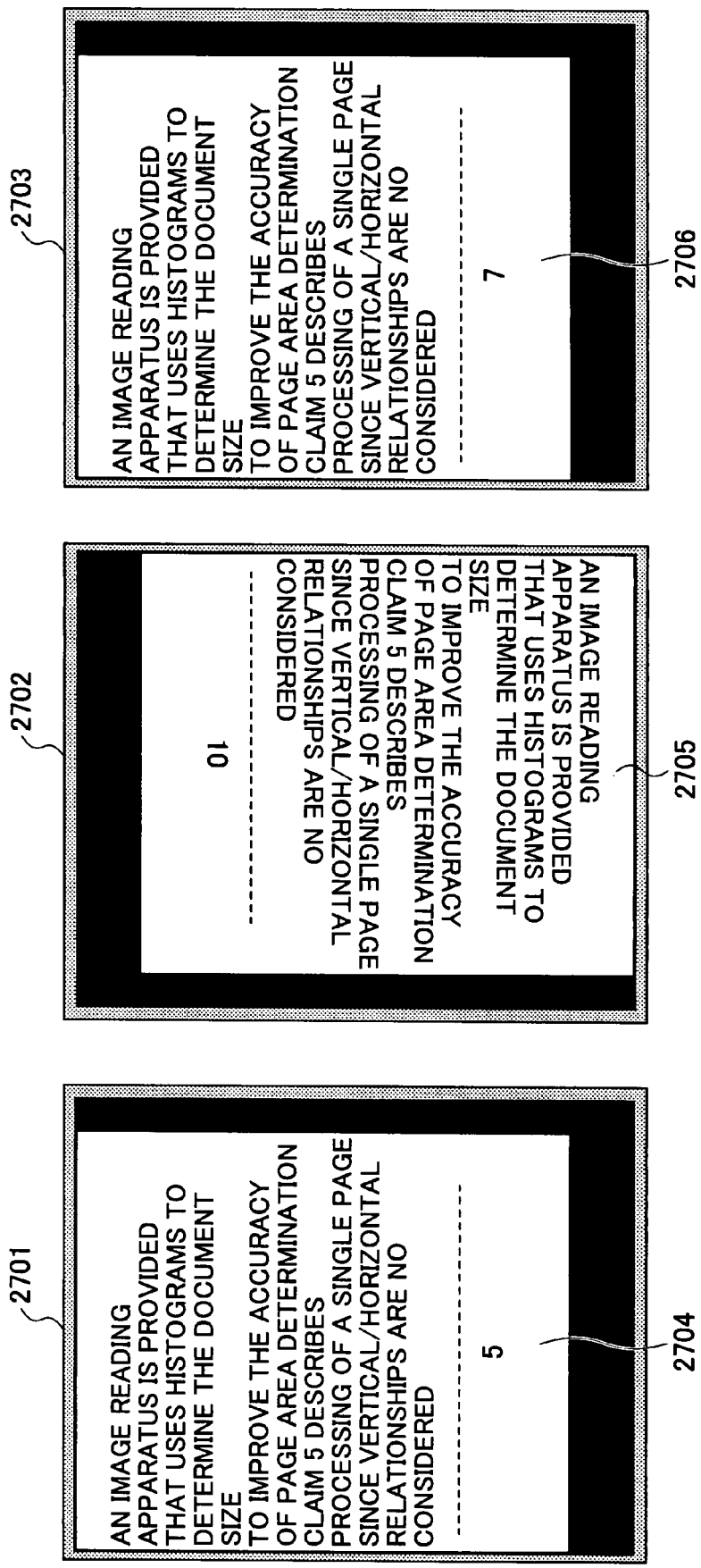
FIG. 27 is a diagram illustrating a document including image data having unnecessary margin portions.

FIG. 27 is a diagram illustrating image data of a document including unnecessary margins. The document includes image data 2701, image data 2702, and image data 2703. The image data 2701 includes a relevant page portion 2704 and a margin portion. The image data 2702 includes a relevant page portion 2705 and a margin portion. The image data 2703 includes a relevant page portion 2706 and a margin portion. As is described above, the respective margin-excluded original page sizes of the image data 2701-2703 may be obtained based on their histograms. Additionally, in the case of reading image data of plural pages, statistical information on the original page sizes of the image data may be obtained and a standard original page size may be calculated therefrom. This standard original page size may be used to determine the page number area and document range of the image data 2701-2703, for example.

Figure 28:
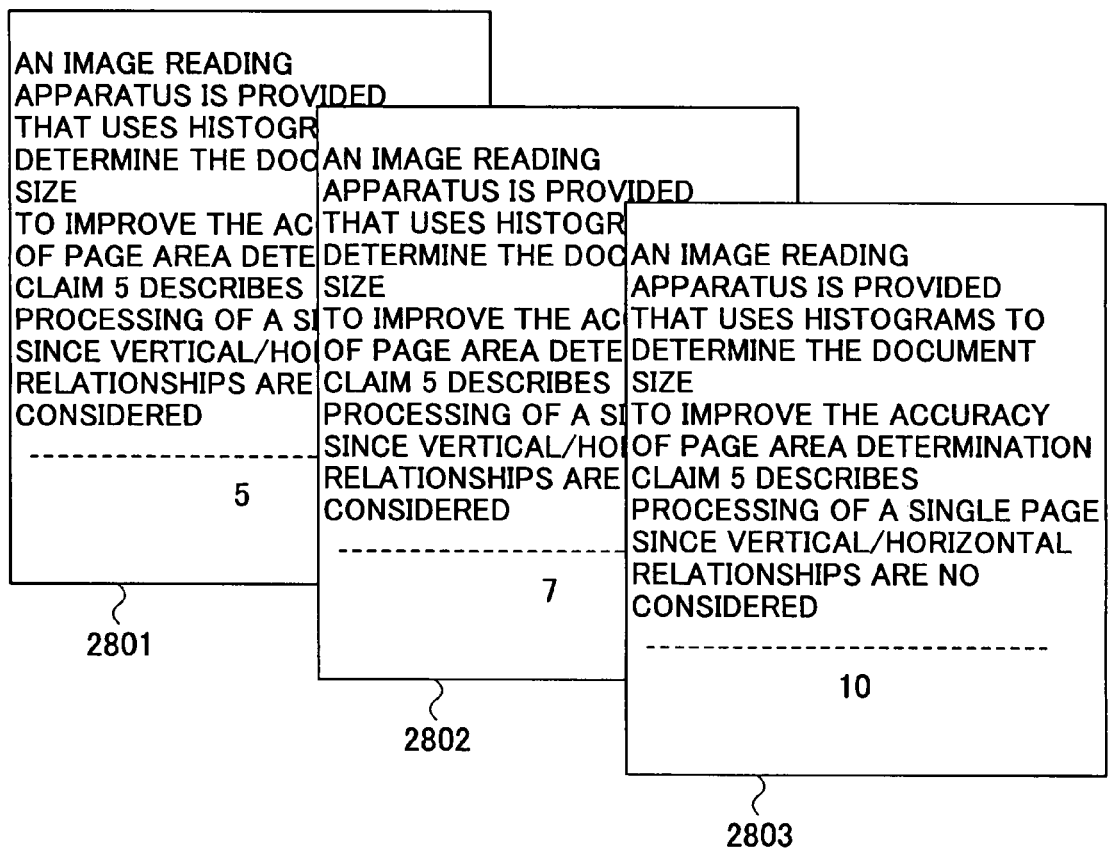
FIG. 28 is a diagram illustrating a document including image data having margin portions removed therefrom.

FIG. 28 is a diagram illustrating a document with pages having unnecessary margins removed therefrom. The image data 2701-2703 shown in FIG. 27 may have margins removed therefrom in the manner illustrated in FIG. 25, for example, and the resulting image data may be rearranged in proper order according to their page number information and recomposed into a document including image data 2801-2803 that are properly arranged in numerical order.

Figure 29:
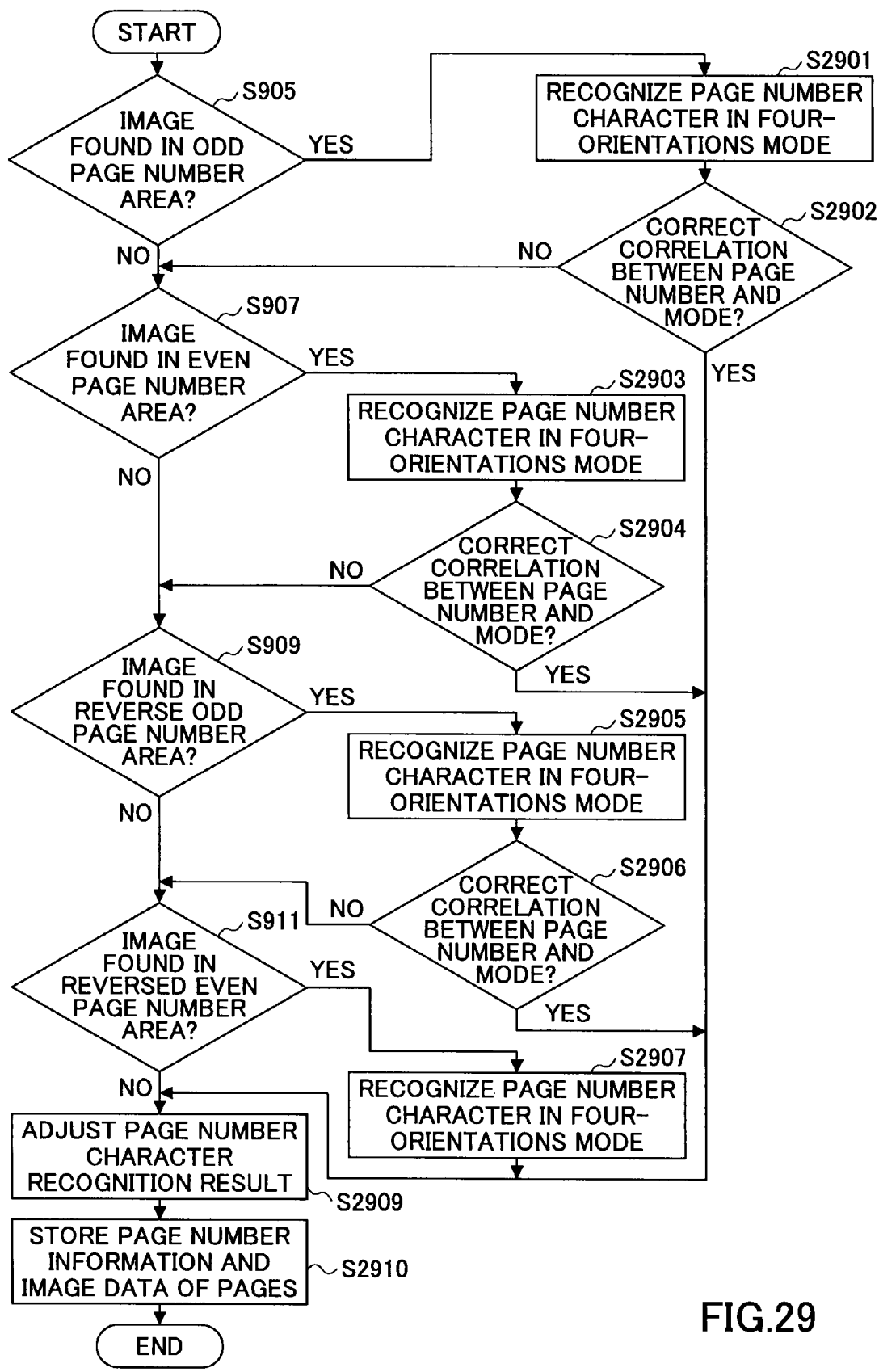
FIG. 29 is a flowchart illustrating another process of recognizing and rearranging image data.

FIG. 29 is a flowchart illustrating another process for recognizing and rearranging image data. In FIG. 9, character recognition is performed on image data in its original orientation (as is read) and image data that are turned upside down.

However, a document page may be read sideways in addition to being read in the proper direction or upside down. Also, the character recognition position may need to be adjusted, for example. FIG. 29 illustrates a process that takes such additional factors into consideration upon recognizing a page number and rearranging image data. It is noted that the process steps S901-S904 of FIG. 9 or the process illustrated in FIG. 24 may be performed before moving on to the present process of recognizing and rearranging image data.

In this process, first, a determination is made as to whether an image exists in an odd page number area (step S905). If an image is found in this area (step S905, YES), page number character recognition in four orientations mode is performed (step S2901). Specifically, it is determined whether the character to be recognized is oriented in the proper direction, turned upside down, turned 90 degrees, or turned 270 degrees, and the orientation of the image is properly adjusted as is necessary to perform character recognition thereon. Then, a determination is made as to whether a correlation between page number and mode is correct (step S2902). If the correlation is not correct (step S2902, NO), the process moves on to step S907. If the correlation is correct (step S2902, YES), the process moves on to step S2909.

If an image is not found in the odd page number area (step S905, NO), a determination is made as to whether an image exists in an even page number area (step S907). If an image is found in this area (step S907, YES), page number character recognition in four orientations mode is performed (step S2903. Specifically, it is determined whether the character to be recognized is oriented in the proper direction, turned upside down, turned 90 degrees, or turned 270 degrees, and the image is properly adjusted as is necessary to perform character recognition thereon. Then, a determination is made as to whether a correlation between page number and mode is correct (step S2904). If the correlation is not correct (step S2904, NO), the process moves on to step S909. If the correlation is correct (step S2904, YES), the process moves on to step S2909.

If an image is not found in the even page number area (step S907, NO), a determination is made as to whether an image exists in a reversed odd page number area (step S909). If an image is found in this area (step S909, YES), page number character recognition is performed in four orientations mode (step S2905). Then, a determination is made as to whether a correlation between page number and mode is correct (step S2906). If the correlation is not correct (step S2906, NO), the process moves on to step S911. If the correlation is correct, (step S2906, YES), the process moves on to step S2909.

If an image is not found in the reversed odd page number area (step S909, NO), a determination is made as to whether an image exists in a reversed even page number area (step S911). If an image is found in this area (step S911, YES), page number character recognition in four orientations mode is performed (step S2907), and the process moves to step S2902.

If an image is not found in the even page number area (step S911, NO), corrections may be made to the page number character recognition (step S2909). That is, a page number may not necessarily be recognized all the time, and at times a character recognition process may end in failure or an inaccurate character recognition result may be obtained, for example. In view of such circumstance, in one preferred embodiment, a page screen may be displayed on a display screen to accept correction inputs, for example. By accepting such corrections, errors in the arrangement order of image data due to image reading errors may be prevented. Then, page number information and image data of corresponding pages are stored (step S2910). Then, the present process may move on to step S913 of FIG. 9.

As can be appreciated from the above descriptions, according to an embodiment of the present invention, a portion of image data of a document is read to recognize a page number included therein so that the order of the image data may be determined. In this way, image data of a document may be rearranged in proper order. That is, image data of pages of a document that are not read in proper order may be processed and rearranged in proper order so that a user may be relieved of the burden of rearranging the pages of a document himself/herself upon before reading the document. For example, embodiments of the present invention may be implemented in the case of reading a double-side printed document where all the odd numbered pages are read before the even numbered pages or reading randomly gathered pages of a document that needs to be rearranged in proper order.

It is noted that an image reading method according to an embodiment of the present invention may be embodied by a computer program that is executed on a computer such a personal computer or a work station. Such a program may be stored in a computer-readable medium such as a hard disk, a flexible disk, a CD-ROM, a MO, or a DVD and may be executed by being downloaded from the computer-readable medium to a computer. Also, the program may be embodied by a transfer medium that is configured to distribute the program via a network such as the Internet.

Also, an image data acquiring unit, an image reading unit, a conversion unit, an order assigning unit, a data generating unit, a rotating unit, a determining unit, and a correction unit of an image reading apparatus according to an embodiment of the present invention may be embodied by a computer performing an image reading method according to an embodiment of the present invention. In one specific example, the above units may be realized by the CPU 201 of FIG. 2 performing relevant control operations according to relevant instructions of an image reading program read from the ROM 202.

Further, it is noted that an image reading apparatus, an image reading method, and an image reading program according to embodiments of the present invention may be advantageously implemented in a scanner, a multifunction machine, and other various types of image processing machines having image reading functions, for example.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-201109 filed on Jul. 24, 2006, the entire contents of which are hereby incorporated by reference.

What is claimed is:
1. An image reading apparatus comprising:
an image data acquiring unit configured to acquire document image data including more than one set of page image data;
an image reading unit configured to read an image located at a predetermined page position from the acquired set of page image data;
a conversion unit configured to recognize the read image of the predetermined page position and convert the recognized image into text data; and an order assigning unit configured to assign page number order to the set of page image data according to value information represented by the converted text data, wherein the image reading unit is configured to read more than one images located at more than one predetermined page positions from the set of page image data, reverse an orientation of the set of page image data when the images of the predetermined page positions are not recognized, and read more than one reversed images located at the more than one predetermined page positions from the reversed set of image data, and the conversion unit is configured to recognize at least one reversed image of the reversed images of the page positions and convert the recognized reversed image into text data.

2. The image reading apparatus as claimed in claim 1, further comprising:

a data generating unit configured to generate new document image data from the acquired document image data by rearranging the page image data according to the assigned page number order and compiling the rearranged page image data into a single file.

3. The image reading apparatus as claimed in claim 1, wherein the image reading unit is configured to read more than one images located at more than one predetermined page positions from the set of page image data; and the conversion unit is configured to recognize at least one image of the images of the predetermined page positions.

4. The image reading apparatus as claimed in claim 2, wherein the image reading unit is configured to read more than one images located at more than one predetermined page positions from the set of page image data; and the conversion unit is configured to recognize at least one image of the images of the predetermined page positions.

5. The image reading apparatus as claimed in claim 1, further comprising:

a data generating unit configured to generate new document image data from the acquired document image data by rearranging the page image data according to the assigned page number order and compiling the rearranged page image data including the reversed set of page image data into a single file.

6. The image reading apparatus as claimed in claim 1, wherein the image reading unit is configured to read more than one images located at more than one predetermined page positions from the set of page image data, and reads more than one images located at more than one reversed page positions of the predetermined page positions from the set of page image data when the images of the predetermined page positions are not recognized, and the conversion unit is configured to reverse at least one image of the images of the reversed page positions read by the image reading unit, recognize the reversed image, and convert the recognized reversed image into text data.

7. The image reading apparatus as claimed in claim 6, further comprising:

a data generating unit configured to generate new document image data from the acquired document image data by rearranging the page image data according to the assigned page number order, reversing the set of page image data having at least one image of the reversed page positions reversed and recognized by the conversion unit, and compiling the rearranged page image data including the reversed set of page image data into a single file.

8. The image reading apparatus as claimed in claim 1, further comprising:

a rotating unit configured to rotate the set of page image data in a rotating orientation corresponding to an orientation of the image of the predetermined page position read by the reading unit;

wherein the conversion unit is configured to determine the orientation of the read image of the predetermined position, recognize the read image in the determined orientation, and convert the recognized image into text data.

9. The image reading apparatus as claimed in claim 8, further comprising:

a data generating unit configured to generate new document image data from the acquired document image data by rearranging the page image data including the set of page image data rotated by the rotating unit according to the page number order assigned by the order assigning unit, and compiling the rearranged page image data into a single file.

10. The image reading apparatus as claimed in claim 2, further comprising:

a rotating unit configured to rotate the set of page image data in a rotating orientation corresponding to an orientation of the image of the predetermined page position read by the image reading unit;

wherein the conversion unit is configured to determine the orientation of the read image of the predetermined position, recognize the read image in the determined orientation, and convert the recognized image into text data.

11. The image reading apparatus as claimed in claim 10, wherein:

the data generating unit is configured to generate the new document image data by rearranging the page image data including the set of page image data rotated by the rotating unit according to the page number order assigned by the order assigning unit and compiling the rearranged page image data into a single file.

12. The image reading apparatus as claimed in claim 1, wherein the set of page image data represents a plurality of pages; and the conversion unit is configured to obtain text data associated with one of the pages and identify a page number of each of the pages based on the obtained text data.

13. The image reading apparatus as claimed in claim 12, further comprising:

a rotating unit configured to rotate the set of page image data in a rotating orientation corresponding to an orientation of the image of the predetermined page position read by the image reading unit; and a data generating unit configured to generate new document image data from the acquired document image data by rearranging the page image data including the set of page image data rotated by the rotating unit according to the page number order assigned by the order assigning unit and compiling the rearranged page image data into a single file;

wherein the conversion unit is configured to determine the orientation of the read image of the predetermined position, recognize the read image in the determined orientation, and convert the recognized image into text data.

14. The image reading apparatus as claimed in claim 2, wherein the set of page image data represents a plurality of pages; and the conversion unit is configured to obtain text data associated with one of the pages and identifies a page number of each of the pages based on the obtained text data.

15. The image reading apparatus as claimed in claim 14, further comprising:

a rotating unit configured to rotate the set of page image data in a rotating orientation corresponding to an orientation of the image of the predetermined page position read by the image reading unit; wherein the conversion unit is configured to determine the orientation of the read image of the predetermined position, recognize the read image in the determined orientation, and convert the recognized image into text data; and the data generating unit is configured to generate the new document image data by rearranging the page image data including the set of page image data rotated by the rotating unit according to the page number order assigned by the order assigning unit and compiling the rearranged page image data into a single file.

16. The image reading apparatus as claimed in claim 1, further comprising:

a determining unit configured to determine an original page size of an original page image included in the set of page image data; and a correction unit configured to correct the predetermined page position within the set of page image data according to the original page size determined by the determining unit.

17. The image reading apparatus as claimed in claim 16, wherein the determining unit is configured to obtain statistical data on the original page size and determines a standard original page size for a plurality of sets of page image data based on the obtained statistical data.

18. An image reading method comprising the steps of:

acquiring document image data including more than one set of page image data;

reading an image located at a predetermined page position from the acquired set of page image data;

recognizing the read image of the predetermined page position and converting the recognized image into text data; and assigning page number order to the set of page image data according to value information represented by the converted text data, wherein the reading operation includes reading more than one images located at more than one predetermined page positions from the set of page image data, reversing an orientation of the set of page image data when the images of the predetermined page positions are not recognized, and reading more than one reversed images located at the more than one predetermined page positions from the reversed set of image data, and the recognizing operation includes recognizing at least one reversed image of the reversed images of the page positions and converting the recognized reversed image into text data.

19. A non-transitory computer-readable medium having stored thereon a computer program which, when executed by a computer, causes the computer to perform a process comprising the steps of:

acquiring document image data including more than one set of page image data;

reading an image located at a predetermined page position from the acquired set of page image data;

recognizing the read image of the predetermined page position and converting the recognized image into text data; and assigning page number order to the set of page image data according to value information represented by the converted text data wherein the reading operation includes reading more than one images located at more than one predetermined page positions from the set of page image data reversing an orientation of the set of page image data when the images of the predetermined page positions are not recognized, and reading more than one reversed images located at the more than one predetermined page positions from the reversed set of image data, and the recognizing operation includes recognizing at least one reversed image of the reversed images of the page positions and converting the recognized reversed image into text data.

* * * * *